(12) United States Patent
Kim et al.

(10) Patent No.: US 9,696,089 B2
(45) Date of Patent: Jul. 4, 2017

(54) GRAIN DRYING APPARATUS USING EXHAUST HEAT OF COMBINE HARVESTER

(71) Applicant: INDUSTRY-ACADEMIC COOPERATION FOUNDATION GYEONG-SANG NATIONAL UNIVERSITY, Gyeongsangnam-do (KR)

(72) Inventors: Hyeon-tae Kim, Gyeonggi-do (KR); Sang-yoon Lee, Daegu (KR); Eun-gyu Choi, Jeju-do (KR); Byeong-eun Moon, Gyeongsangnam-do (KR); Byung-ok Jin, Gyeongsangnam-do (KR); Chi-ho Kim, Gyeongsangnam-do (KR)

(73) Assignee: Industry-Academic Cooperation Foundation Gyeongsang National University, Gyeongsangnam-do (KR)

( * ) Notice: Subject to any disclaimer, the term of this patent is extended or adjusted under 35 U.S.C. 154(b) by 340 days.

(21) Appl. No.: 14/384,812

(22) PCT Filed: Mar. 13, 2013

(86) PCT No.: PCT/KR2013/002031
§ 371 (c)(1),
(2) Date: Sep. 12, 2014

(87) PCT Pub. No.: WO2013/137650
PCT Pub. Date: Sep. 19, 2013

(65) Prior Publication Data
US 2015/0026992 A1 Jan. 29, 2015

(30) Foreign Application Priority Data

Mar. 15, 2012 (KR) .................. 10 2012 0026708

(51) Int. Cl.
*F26B 23/00* (2006.01)
*A01D 41/133* (2006.01)
(Continued)

(52) U.S. Cl.
CPC .......... *F26B 23/001* (2013.01); *A01D 41/133* (2013.01); *F01N 5/02* (2013.01);
(Continued)

(58) Field of Classification Search
CPC .. F26B 23/001; F26B 2200/06; A01D 41/133; F01N 5/02; F01N 3/021; Y02T 10/166; Y02T 10/16; F02G 5/02
See application file for complete search history.

(56) References Cited

U.S. PATENT DOCUMENTS 2,537,186 A * 1/1951 Everett ................ A01D 41/133
34/129

FOREIGN PATENT DOCUMENTS

JP 2008-048707 A 3/2008
JP 2008-295364 A 12/2008
(Continued)

OTHER PUBLICATIONS

International Search Report dated Jul. 17, 2013 corresponding to PCT/KR2013/002031 with English translation, 5 pp.

*Primary Examiner* — Jiping Lu
(74) *Attorney, Agent, or Firm* — Ohlandt, Greeley, Ruggiero & Perle, LLP

(57) ABSTRACT

Disclosed is a grain drying apparatus installed in a combine harvester. The grain drying apparatus using exhaust heat of a combine harvester according to the present invention comprises: an intake duct one end of which is connected to an exhaust port of the combine harvester and the other end of which outputs the hot air discharged from the exhaust port; a filter unit located at the other end of the intake duct
(Continued)

for removing harmful components from the hot air; and an exhaust duct connected to the other end of the filter unit to supply the hot air from which the harmful components are removed to a grain selection pan of the combine harvester.

11 Claims, 3 Drawing Sheets

(51) Int. Cl.
  *F01N 5/02* (2006.01)
  *F02G 5/02* (2006.01)
  *F01N 3/021* (2006.01)
(52) U.S. Cl.
  CPC ............... *F01N 3/021* (2013.01); *F02G 5/02* (2013.01); *F26B 2200/06* (2013.01); *Y02T 10/16* (2013.01); *Y02T 10/166* (2013.01)

(56) References Cited

FOREIGN PATENT DOCUMENTS

| | | |
|---|---|---|
| JP | 2011-024510 A | 2/2011 |
| JP | 2011-147397 A | 8/2011 |

\* cited by examiner

[Fig. 1]
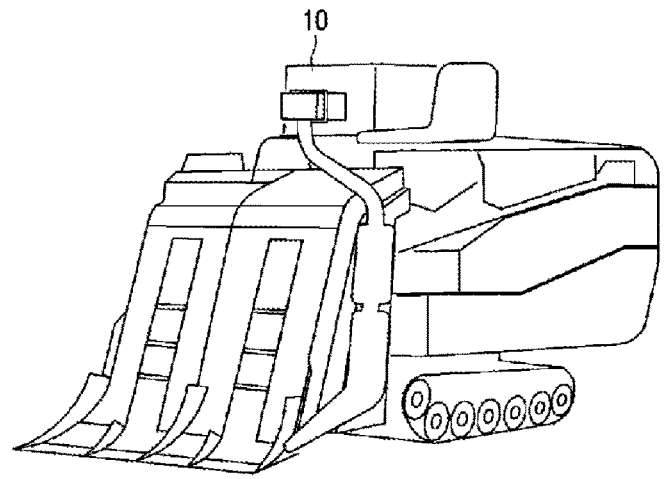
[Fig. 2]
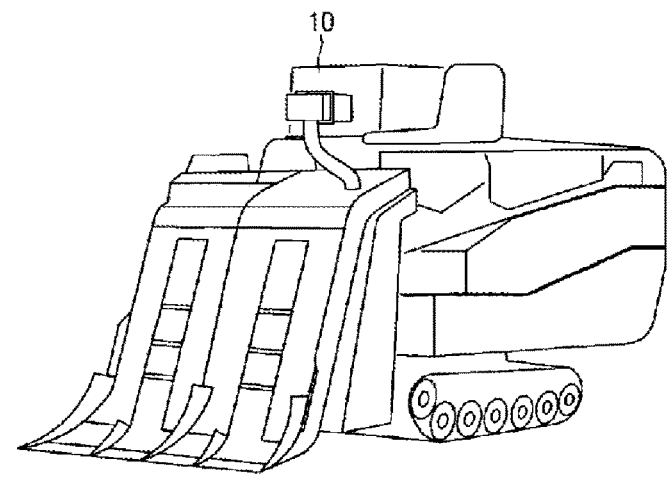
[Fig. 3]
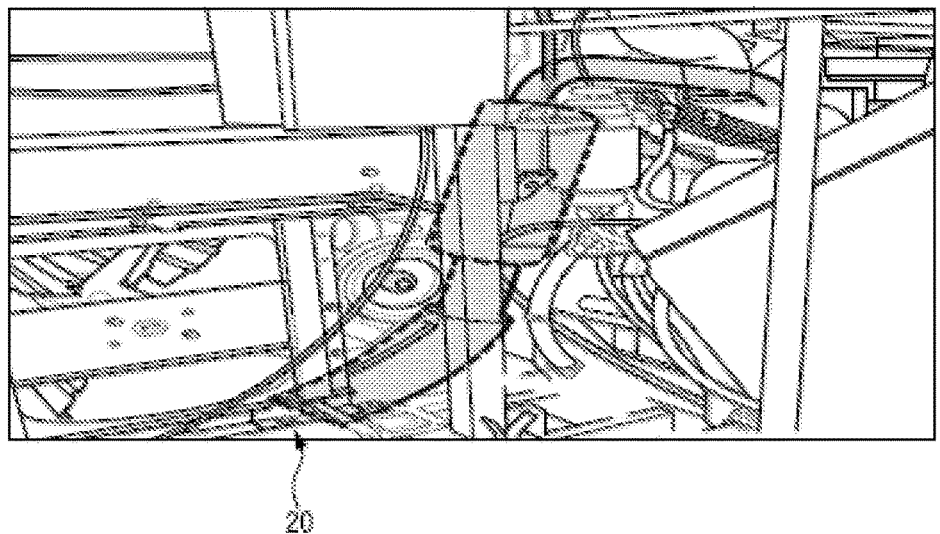

[Fig. 4]
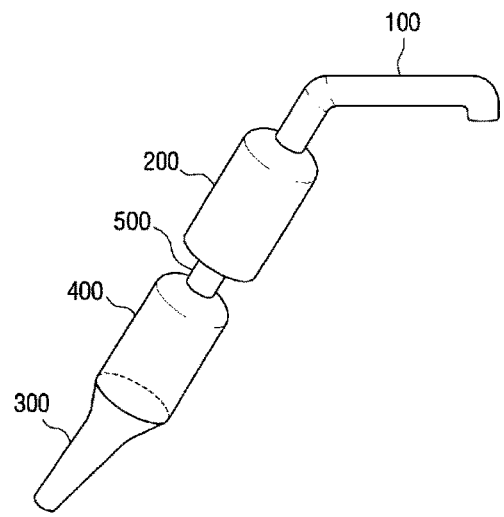
[Fig. 5]
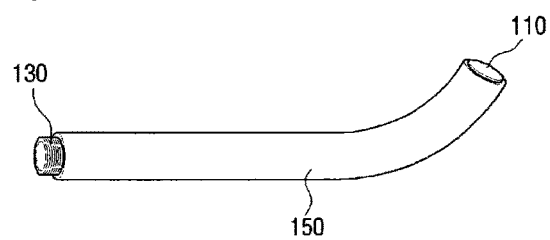
[Fig. 6]
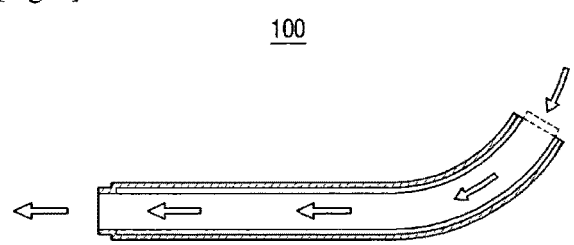
[Fig. 7]
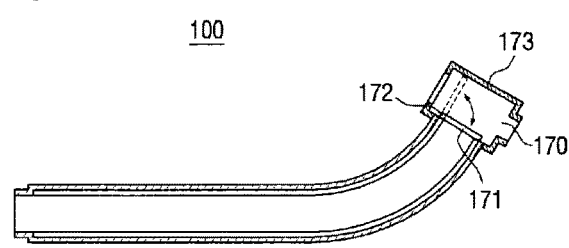
[Fig. 8]
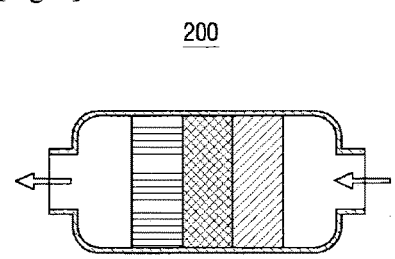

[Fig. 9]
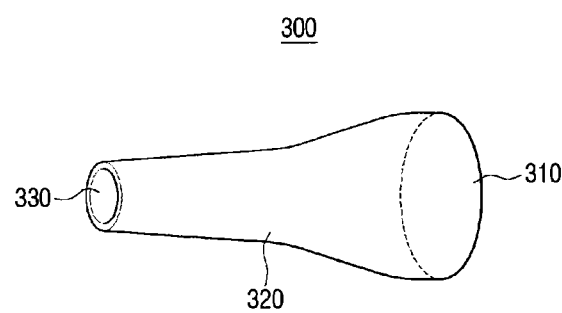
[Fig. 10]
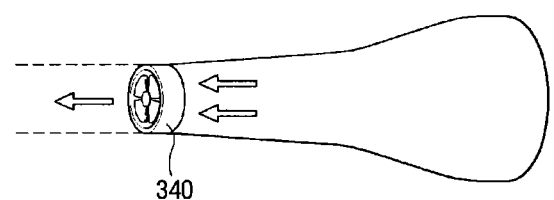

GRAIN DRYING APPARATUS USING EXHAUST HEAT OF COMBINE HARVESTER

FIELD OF INVENTION

The present general inventive concept generally relates to a grain drying apparatus, and more particularly, to a grain drying apparatus which dries harvested grains by using exhaust heat of a combine harvester.

BACKGROUND OF INVENTION

A combine harvester refers to an agricultural machine which harvests, threshes, and sorts grains, such as rice, barely, wheat, feed crop seeds, etc., while driving farmland.

The combine harvester harvests the grains, stores the grains in a tank or a bag, and moves the grains to a drying room.

There are various types of combine harvesters, which may be roughly divided into a head-feed combine harvester and an ordinary combine harvester. The head-feed combine harvester inserts and threshes only ears into a threshing unit while holding a lower part of a cut crop stem mechanically and moving the part in parallel with an axis of a threshing cylinder. The combine harvesters other than the head-feed combine harvester are the ordinary combine harvester.

In a threshing operation of a combine harvester, exhaust heat is generated due to an operation of an engine. The conventional combine harvester discharges the exhaust heat through an exhaust port. In case of a combine harvester having a drying system, the combine harvester consumes extra energy to dry grains since the drying system requires separate power.

DETAILED DESCRIPTION OF INVENTION

Technical Purpose

The present disclosure has been provided to address the aforementioned and other problems and disadvantages occurring in the related art, and an aspect of the present disclosure provides a grain drying apparatus which does not require extra energy and reduces a grain drying time by reusing exhaust heat of an engine and reducing a moisture content of threshed grains in a harvesting operation of a combine harvester.

Means to Resolve the Problems

A grain drying apparatus using exhaust heat of a combine harvester according to an exemplary embodiment includes an intake duct one end of which is connected to an exhaust port of the combine harvester and the other end of which outputs the hot air discharged from the exhaust port, a filter unit located at the other end of the intake duct for removing harmful components from the hot air, and an exhaust duct connected to the other end of the filter unit to supply the hot air from which the harmful components are removed to a grain selection pan of the combine harvester.

In this case, the intake duct may include a first connector which is connected to the exhaust port of the combine harvester, a second connector which is connected to the exhaust duct, and a passage which is disposed between the first connector and the second connector. In addition, the passage may be formed of a heat-resistant material and have a bendable and cylindrical structure.

The passage may include an outer circumference surface of the cylindrical structure. The outer circumference surface may be coated with a thermal insulation material.

Meanwhile, the intake duct may include an intake connector having a door for selectively opening or closing the intake duct on a front end thereof, an actuator for driving the door, and a housing including the door and the actuator.

A heat exchanger for enhancing heat exchange efficiency may be disposed on a portion where the intake duct and the exhaust duct intersect.

The filter unit may be a replaceable dust collecting filter which collects harmful chemical components included in the hot air.

The exhaust duct may further include a blast fan for discharging the hot air to the grain selection pan.

In this case, the exhaust duct may be formed of a heat-resistant material and may have a bendable and cylindrical structure.

The exhaust duct may further include an embedded pin radiator.

The intake duct may have a diameter smaller than a diameter of the exhaust duct.

The grain drying apparatus may further include a connector configured to connect the intake duct and the exhaust duct.

A combine harvester according to an exemplary embodiment includes an intake duct one end of which is connected to an exhaust port of the combine harvester and the other end of which outputs hot air discharged from the exhaust port, a filter unit located at the other end of the intake duct for removing harmful components from the hot air, and an exhaust duct connected to the other end of the filter unit to supply the hot air from which the harmful components are removed to a grain selection pan of the combine harvester.

Effect

According to various exemplary embodiment of the present disclosure, a grain drying apparatus does not require extra energy and reduces a grain drying time by reusing exhaust heat of an engine and reducing a moisture content of threshed grains in a harvesting operation of a combine harvester.

BRIEF DESCRIPTION OF THE DRAWINGS

FIG. 1 is a diagram provided to describe a grain drying apparatus which is disposed outside of a combine harvester according to an exemplary embodiment;

FIG. 2 is a diagram provided to describe a grain drying apparatus which is disposed inside of the combine harvester according to another exemplary embodiment;

FIG. 3 is a diagram provided to describe a grain drying apparatus which is disposed inside of the combine harvester and not illustrated in FIG. 2;

FIG. 4 is a diagram provided to describe a grain drying apparatus according to an exemplary embodiment;

FIG. 5 is a diagram provided to describe an intake duct of the grain drying apparatus of FIG. 4;

FIG. 6 is a sectional view provided to describe a thermal insulation material coated on an outer circumference surface of the intake duct of FIG. 5;

FIG. 7 is a diagram provided to describe an intake duct according to another exemplary embodiment;

FIG. 8 is a sectional view provided to describe a filter unit illustrated in FIG. 4;

FIG. 9 is a diagram provided to describe an exhaust duct illustrated in FIG. 4; and FIG. 10 is a diagram provided to describe an exhaust duct having a blast fan.

DETAILED DESCRIPTION OF THE EXEMPLARY EMBODIMENTS

Certain exemplary embodiments are described in greater detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a diagram provided to describe a grain drying apparatus which is disposed outside of a combine harvester according to an exemplary embodiment.

Referring to FIG. 1, hot air outputted from an exhaust port 10 of a combine harvester is air heated by exhaust heat of an engine. One end of the grain drying apparatus according to an exemplary embodiment may be connected to the exhaust port 10 and the other end may be connected to a grain selection pan (not shown) of the combine harvester.

The grain drying apparatus may be designed to be exposed outside of the combine harvester. In this case, the hot air discharged from the exhaust port is transferred to the grain selection pan of the combine harvester through the grain drying apparatus. That is, the grain drying apparatus transfers the hot air to the grain selection pan of the combine harvester while being exposed to external air. Thus, it is possible to enhance heat efficiency by coating an outer circumference surface of the grain drying apparatus with the thermal insulation material.

That is, the grain drying apparatus is connected to the exhaust port of the combine harvester through the intake duct and connected to the grain selection pan through the exhaust duct. Thus, the grain drying apparatus may perform a grain drying operation and a grain sorting operation simultaneously by applying heat to the grains.

FIG. 2 is a diagram provided to describe a grain drying apparatus which is disposed inside of the combine harvester according to another exemplary embodiment.

Referring to FIG. 2, hot air outputted from the exhaust port 10 of the combine harvester is air heated by exhaust heat of an engine. One end of the grain drying apparatus according to an exemplary embodiment may be connected to the exhaust port 10 and the other end may be connected to a grain selection pan (not shown) of the combine harvester.

In this case, a part of the intake duct of the grain drying apparatus is exposed outside of the combine harvester and connected to the exhaust port of the combine harvester. The other parts of the grain drying apparatus is embedded in the combine harvester and connected to the grain selection pan of the combine harvester.

FIG. 3 is a diagram provided to describe a grain drying apparatus which is disposed inside of the combine harvester and not illustrated in FIG. 2.

Referring to FIG. 3, among the components of the grain drying apparatus, a part which is exposed outside is a part of the intake duct. The other part of the intake duct which is not exposed outside, the filter unit which filter units the harmful components in the hot air, the connector, and the exhaust duct are connected sequentially, and the exhaust duct is connected to the grain selection pan 20.

The components of the grain drying apparatus according to an exemplary embodiment will be described below in further detail.

FIG. 4 is a diagram provided to describe a grain drying apparatus according to an exemplary embodiment.

Referring to FIG. 4, the grain drying apparatus includes an intake duct 100, a filter unit 200, an exhaust duct 300, a heat exchanger 400, and a connector 500.

The intake duct 100 may have one end which is connected to the exhaust port of the combine harvester and the other end which is connected to the filter unit 200. The intake duct 100 aspirates the hot air outputted from the exhaust port of the combine harvester and transfers the hot air to the filter unit 200.

The filter unit 200 removes the harmful components included in the hot air outputted from the exhaust port.

The exhaust duct 300 is connected to the other end of the filter unit 200 and transfer the hot air of which the harmful components are removed to the grain selection pan of the combine harvester.

FIG. 5 is a diagram provided to describe an intake duct of the grain drying apparatus of FIG. 4. Referring to FIG. 5, the intake duct 100 may be implemented as a bendable, cylindrical, and corrugated member.

That is, the intake duct 100 may include a first connector 110 being connected to the exhaust port and a second connector 130 being connected to the filter unit 200. The first connector 110 and the second connector 130 may be connected through a passage 150.

A part where the intake duct 100 is implemented as a bendable, cylindrical, and corrugated member is the passage 150. For example, the first connector 110 and the second connector 130 may be connected to one end of the exhaust port or the filter unit 200 through a screw fit method or a force fit method.

The passage 150 may coat the outer circumference surface of the cylindrical structure with the thermal insulation material thereby enhancing the heat efficiency.

FIG. 6 is a sectional view provided to describe a thermal insulation material coated on an outer circumference surface of the intake duct of FIG. 5.

Referring to FIG. 6, an outer circumference surface of the passage 150 of the intake duct may be coated with an insulating layer 151 by using the thermal insulation material. The insulating layer 151 prevents the hot air which passes through the passage 150 of the intake duct 100 from being cooled thereby enhancing the heat efficiency.

As shown in FIG. 6, the hot air which inflows into the first connector 110 flows to the second connector through the passage 150.

FIG. 7 is a diagram provided to describe an intake duct according to another exemplary embodiment.

Referring to FIG. 7, the intake duct 100 may include a door 171 for selectively opening and closing the intake duct 100 on a front end thereof, an actuator for driving a door 172, and an intake connector 170 consisting of a housing 173 including the door 171 and the actuator 172.

The intake connector 170 is a part which is substantially connected to an exhaust port 10 of the combine harvester. One end of the intake connector 170 includes an output unit which is connected to outside, and the other end of the intake connector includes an opening which is connected to the first connector 110.

The intake connector 170 controls a location of the door 171 by using the actuator 172. Thus, when performing a grain drying operation, the intake connector 170 moves the door which blocks the first connector 110 of the intake duct 100 to the output unit, and when not performing the grain drying operation, blocks the first connector 110 of the intake duct 100.

In the grain harvesting process of the combine harvester, the hot air heated by the engine of the combine harvester is transferred to the filter unit 200 through the intake duct 100. The heated hot air mainly includes the exhaust gas, and thus, the harmful components are removed from the hot air.

FIG. 8 is a sectional view provided to describe a filter unit illustrated in FIG. 4.

Referring to FIG. 8, the filter unit 200 may be a wet dust collector or a dry dust collector. In the present disclosure, the hot air is used to dry the grains, and thus, a dry dust collecting method is used.

FIG. 8 illustrates filters in various sizes and shapes overlap with each other. According to a size of a strainer of the filter, minute particles may be removed. However, it is not possible to remove various harmful components included in the hot air based solely on such a physical method.

Accordingly, the filter unit 200 may be implemented as a replaceable dust collecting filter which may collect the harmful chemical components included in the hot air.

That is, the filter unit 200 may be implemented as a dust collecting device which may remove the minute particles of ash included in the hot air. Such minute particles vary from 1 mm to 1 µm or less. Relatively big particle may be removed easily, but it is difficult to remove a minute particle which affects a human body adversely.

The filter unit 200 removes the harmful components included in the hot air since the hot air may contact the grains directly. The filter unit 200 may remove the harmful components according to various methods of using gravity, filter, inertia/centrifugal force, sound wave, or washing.

The filter unit 200 may roughly divided into a mechanical type and an electrical type. The mechanical type includes a wet type and a dry type. A dust collector using a washing method is called a scrubber, which is used for air cleaning of factories including a chemical factory, a movie theater, etc. There are various types of scrubbers, for example, a jet scrubber which ejects cleaning water by using a jet, a cyclone scrubber which ejects water from several ports.

However, the present exemplary embodiment relates to using the hot air for drying the grains, and thus, the method of filtering the hot air is performed by a dry method. The filter unit 200 may be implemented by an electrical method having good efficiency. An electrical dust collector includes a Cottrell, for example.

The grain drying apparatus may further include the heat exchanger 400 on a part where the intake duct 100 and the exhaust duct 300 intersect.

In addition, a diameter of the intake duct 100 of the grain drying apparatus is smaller than a diameter of the exhaust duct 300. Accordingly, the connector 500 for connecting the intake duct 100 and the exhaust duct 300 is required.

The connector 500 performs a role of simply converting the diameters of the intake duct 100 and the exhaust duct 300. The connector 500 may be embedded into the heat exchanger 400.

FIG. 9 is a diagram provided to describe an exhaust duct illustrated in FIG. 4.

Referring to FIG. 9, the exhaust duct 300 includes an inlet port 310, a body 320, and an outlet 330.

A diameter of the inlet 310 of the exhaust duct 300 is different from a diameter of the outlet 330. The body 320 may be configured to have a form of a gradual streamline and a size of a diameter of the outlet 330.

The exhaust duct 300 is formed of a thermal insulation material and may have a bendable cylindrical structure. For example, the exhaust duct 300 may be formed of metal or alloy and may be corrugated to achieve a bendable cylindrical structure.

The exhaust duct 300 discharges the hot air to the grain selection pan. For the operation, a blast fan 340 is further included on a side of the outlet 330 of the exhaust duct 300.

Alternatively, the exhaust duct 300 may further include a pin radiator therein. That is, as the exhaust duct 300 includes a pin radiator inside the exhaust duct 300, heat may be discharged to atmosphere. In particular, the pin radiator of the exhaust duct 300 may allow hot water to pass through a conduit to which several fins formed of a thin metal plate are attached so that the heat is discharged to the atmosphere.

FIG. 10 is a diagram provided to describe an exhaust duct having a blast fan.

Referring to FIG. 10, in order to discharge air in the exhaust duct 300 to outside efficiently, the blast fan 340 discharges the air by using a vane which rotates at an appropriate speed according to an air flow.

As given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A grain drying apparatus using exhaust heat of a combine harvester, the apparatus comprising:
    an intake duct one end of which is connected to an exhaust port of the combine harvester and the other end of which outputs the hot air discharged from the exhaust port;
    a filter unit one end of which is connected to the other end of the intake duct for removing harmful components from the hot air; and
    an exhaust duct connected to the other end of the filter unit and a grain selection pan of the combine harvester and supplies the hot air from which the harmful components are removed to the grain selection pan of the combine harvester,
    wherein the intake duct comprises an intake connector for connecting to the exhaust port on the one end, and
    the exhaust duct comprises:
    a door for selectively opening or closing the intake duct;
    an actuator for driving the door;
    and a housing including the door and the actuator.

2. The apparatus as claimed in claim 1, wherein the intake duct comprises a first connector which is connected to the exhaust port of the combine harvester, a second connector which is connected to the exhaust duct, and a passage which is disposed between the first connector and the second connector, wherein the passage is formed of a heat-resistant material and has a bendable and cylindrical structure.

3. The apparatus as claimed in claim 2, wherein the passage comprises an outer circumference surface of the cylindrical structure, the outer circumference surface being coated with a thermal insulation material.

4. The apparatus as claimed in claim 1, wherein a heat exchanger for enhancing heat exchange efficiency is disposed on a portion where the intake duct and the exhaust duct intersect.

5. The apparatus as claimed in claim 1, wherein the filter unit is a replaceable dust collecting filter which collects harmful chemical components included in the hot air.

6. The apparatus as claimed in claim 1, wherein exhaust duct further comprise a blast fan for discharging the hot air to the grain selection pan.

7. The apparatus as claimed in claim 6, wherein the exhaust duct is formed of a heat-resistant material and has a bendable and cylindrical structure.

8. The apparatus as claimed in claim 1, wherein the exhaust duct further comprises an embedded pin radiator.

9. The apparatus as claimed in claim 1, wherein the intake duct has a diameter smaller than a diameter of the exhaust duct.

10. The apparatus as claimed in claim 9 further comprising:
 a connector configured to connect the intake duct and the exhaust duct.

11. A combine harvester comprising:
 an intake duct one end of which is connected to an exhaust port of the combine harvester and the other end of which outputs the hot air discharged from the exhaust port;
 a filter unit one end of which is connected to the other end of the intake duct for removing harmful components from the hot air; and
 an exhaust duct connected to the other end of the filter unit and a grain selection pan of the combine harvester and supplies the hot air from which the harmful components are removed to the grain selection pan of the combine harvester,
 wherein the intake duct comprises an intake connector for connecting to the exhaust port on the one end, and
 the exhaust duct comprises:
 a door for selectively opening or closing the intake duct;
 an actuator for driving the door;
 and a housing including the door and the actuator.

\* \* \* \* \*